(12) United States Patent
Hadar

(10) Patent No.: US 11,297,941 B1
(45) Date of Patent: Apr. 12, 2022

(54) PORTABLE COLLAPSIBLE VARIABLE HEIGHT BOOK STAND

(71) Applicant: Chanoch Hadar, Huntington Woods, MI (US)

(72) Inventor: Chanoch Hadar, Huntington Woods, MI (US)

( * ) Notice: Subject to any disclaimer, the term of this patent is extended or adjusted under 35 U.S.C. 154(b) by 0 days.

(21) Appl. No.: 17/138,315

(22) Filed: Dec. 30, 2020

(51) Int. Cl.
*A47B 23/04* (2006.01)
*F16M 11/38* (2006.01)
*F16M 11/20* (2006.01)

(52) U.S. Cl.
CPC ....... *A47B 23/043* (2013.01); *F16M 11/2021* (2013.01); *F16M 11/38* (2013.01); *F16M 2200/024* (2013.01); *F16M 2200/028* (2013.01)

(58) Field of Classification Search
USPC ....... 248/454, 455, 456, 457, 460, 462, 463, 248/465
See application file for complete search history.

(56) References Cited

U.S. PATENT DOCUMENTS

| 70,339 | A | 10/1867 | Kreitz | |
|---|---|---|---|---|
| 5,078,056 | A | 1/1992 | McCauley | |
| 5,290,002 | A * | 3/1994 | Cohen | A47B 23/043 248/456 |
| 5,722,628 | A * | 3/1998 | Menaged | A47B 23/043 211/50 |
| 6,435,466 | B1 * | 8/2002 | Adams | A47B 23/044 248/455 |
| 7,364,129 | B1 | 4/2008 | Levari, Jr. | |
| 7,828,260 | B2 | 11/2010 | Hauser et al. | |
| 8,567,740 | B2 * | 10/2013 | Tarnutzer | B42D 9/00 248/456 |
| 2009/0289166 | A1 | 11/2009 | Hopfer | |

* cited by examiner

*Primary Examiner* — Alfred J Wujciak

(57) ABSTRACT

A book stand having three interconnected sections that is adjustable between a closed state where it is portable, and an open state, the open state being one of a number of heights, which height is selectable by the user to account for users of different sizes and users that are standing or sitting when using a book placed on the book stand. The middle section has a strut containing notches on both sides, one side for receiving a stem connected to the top section, the other side for receiving a stem from the bottom section, so that the user may adjust the height of the book stand for use on a surface for when the user wants to stand or sit down. Such book stands are useful for religious studies, particularly as a shtender.

20 Claims, 6 Drawing Sheets

PORTABLE COLLAPSIBLE VARIABLE HEIGHT BOOK STAND

FIELD OF THE INVENTION

The present invention provides for a portable, collapsible book stand having a slim and compact closed state and an expanded state that can be varied between heights for supporting a book or other material, particularly for use in teaching, studying, and learning, more particularly for use as a shtender in religious studies.

BACKGROUND OF THE INVENTION

There are a number of known structures for supporting a book, presentation materials, lecture notes, tablet, laptop and the like (hereinafter individually and collectively referred to as a "book"), at an angle relative to horizontal that is comfortable to the reader (hereinafter a "reading angle"), which have a selectively variable height relative to a base surface, for example, a table, desk or even floor. More particularly, there are known structures that have three or more sections that are hinged together with structural elements that interconnect the different sections so as to maintain the book supporting section at one of a number of preselected desired heights and reading angle for the user, who may be sitting or standing relative to the surface and the book stand, recognizing that users of different sizes may utilize different heights for standing and sitting and may change from standing to sitting and vice versa during use. Examples include U.S. Pat. No. 70,339 entitled Desk, U.S. Pat. No. 5,078,056 entitled Folding Table Construction, U.S. Pat. No. 7,364,129 entitled Collapsible Stand, U.S. Pat. No. 7,828,260 entitled Deployable Support Unit for Reading Material, and US Patent Publication No. US2009/0289166A1, entitled Compact, Articulated Lectern for a Book, Papers, or Other Such Articles.

The starting point of the present invention lies in the observation that, with the techniques already known in the prior art, the prior known portable collapsible variable height book stands suffer from a complexity of manufacture and use that makes them unable to collapse to a sufficiently flat state, and which use contrasting materials that detract from the desired aesthetic, particularly for use in connection with a religious learning experience. Specifically, elements of the device tend to have structural features that interfere with the ability of the multiple sections to lay flat. This can lead to an inability to stack multiple book stands for storage, and require additional space. The bookstands are also less portable. These problems include the use of metal or wooden structures that project between adjacent sections that require the adjacent sections to be spaced apart when in the closed state, and for example the use of non-wood structural elements to minimize the thickness and space between adjacent wood surfaces when in a closed state and still achieve the strength required to support the book stand when in an open state. The spacing and/or protrusions compromise the durability of the bookstand when stacked, carried or transported. A solid and flush folded position would allow for a dense and durable package. Protrusions, mixed materials and wasted cavities can look unseemly, and offend the interior design generally found in spaces where the bookstands feature. Hence, there is a need for an improved structure and other improvements which are addressed, among others, by the present invention.

SUMMARY OF THE INVENTION

According to a broad aspect of the invention, notches are etched into both sides of a single strut of the middle panel. The top panel drops a stem, into any of the notches below it, to prop it up at various angles. From the bottom panel a stem can be lifted (or spring-loaded to pop up when the middle panel is lifted) to slot into one of the notches above it, depending on the desired angle.

According to a further aspect of the invention, the bookstand will now fold into a flush and flat position, allowing for greater portability, durability and compactness. The panels, stems and notches can all be fabricated from wood (or another single material) to neatly match any desired interior design.

BRIEF DESCRIPTION OF THE DRAWINGS

Further features, characteristics and advantages of the present invention will become apparent to a person of ordinary skill in the art in view of the following detailed description of preferred embodiments of the invention, made with reference to the attached figures, in which the same number references designate identical or functionally similar elements from one figure to the other, and in which.

DETAILED DESCRIPTION CERTAIN OF EMBODIMENTS OF THE INVENTION

Figure 1:
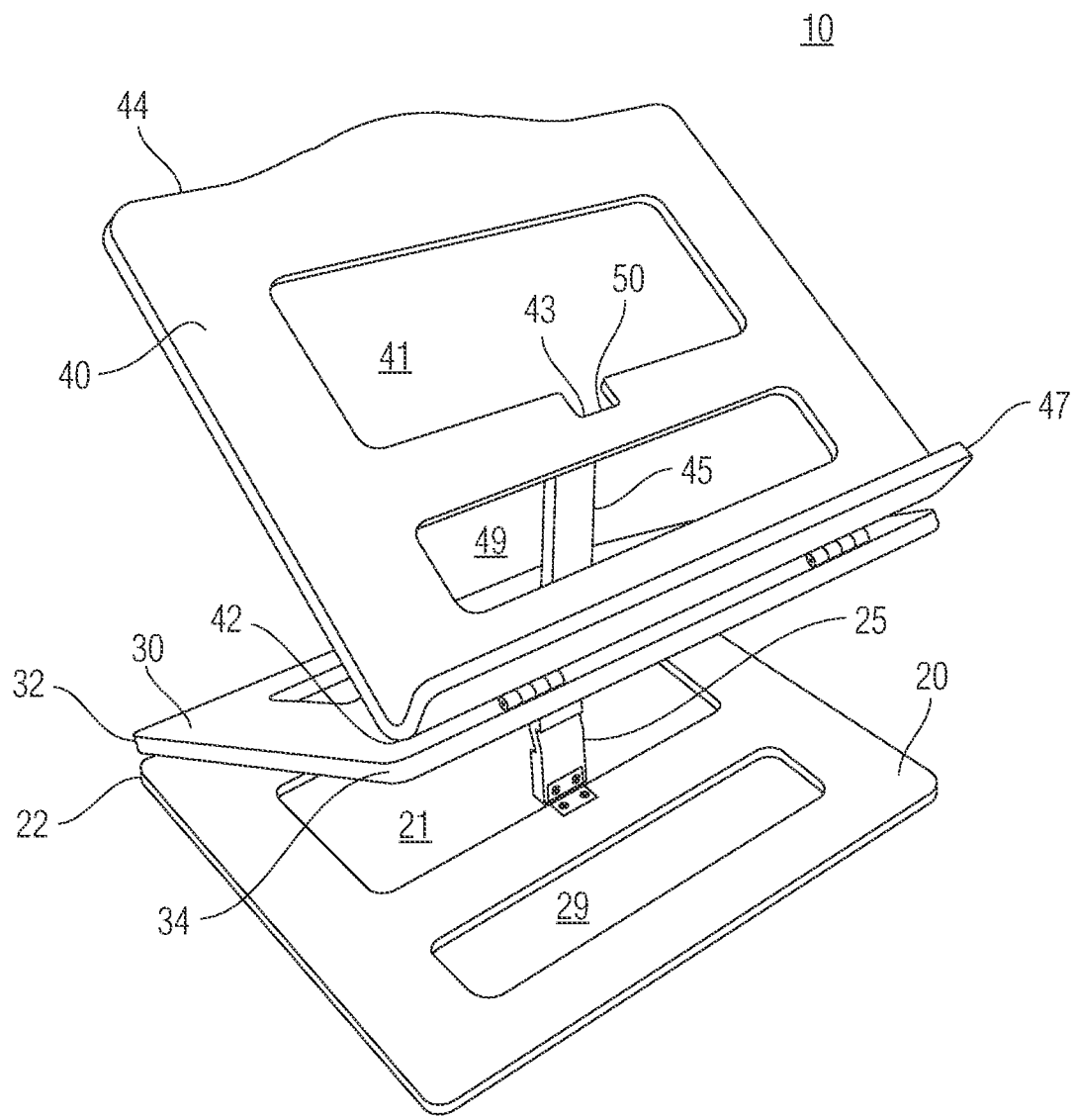
FIG. 1 illustrates an elevated perspective view of a book stand in accordance with a preferred embodiment of the present invention.

One will now describe an example embodiment of the device of this invention. With reference to FIGS. 1-6, a collapsible, portable, variable height book stand 10 is provided comprising a bottom section 20, a middle section 30, and a top section 40, each section being generally planar and having a similar perimeter shape and thickness dimension, whereby one edge 22 of the bottom section 20 and one edge 32 of the middle section 30 are interconnected by a flexible hinge 50 (two such hinges 50 are shown in embodiment illustrated in FIG. 2), and the opposite edge 34 of the middle section 30 and one edge 42 of the top 40 are interconnected by a flexible hinge 50 (two such hinges 50 are shown in embodiment illustrated in FIG. 2). Thus, the top 40, middle 30 and bottom 20 sections articulate between a fully open position (FIG. 6) and a closed position (FIG. 3).

The middle section 30 is provided with a strut member 35 having a first plurality of notches 33 facing one side of the middle section 30 and a second plurality of notches 36 facing the other side of the middle section 30. The top section 40 is provided with an aperture 41 and rigid stem 45 having a thickness that is the same or less than the thickness of the top section 40, the rigid stem being flexibly interconnected to an edge 43 of the top section aperture 41, preferably by a hinge 50, so that stem 45 can pivot from a closed position that is recessed within the aperture 41 and does not project beyond the thickness of the top section 40 (see FIG.

Figure 2:
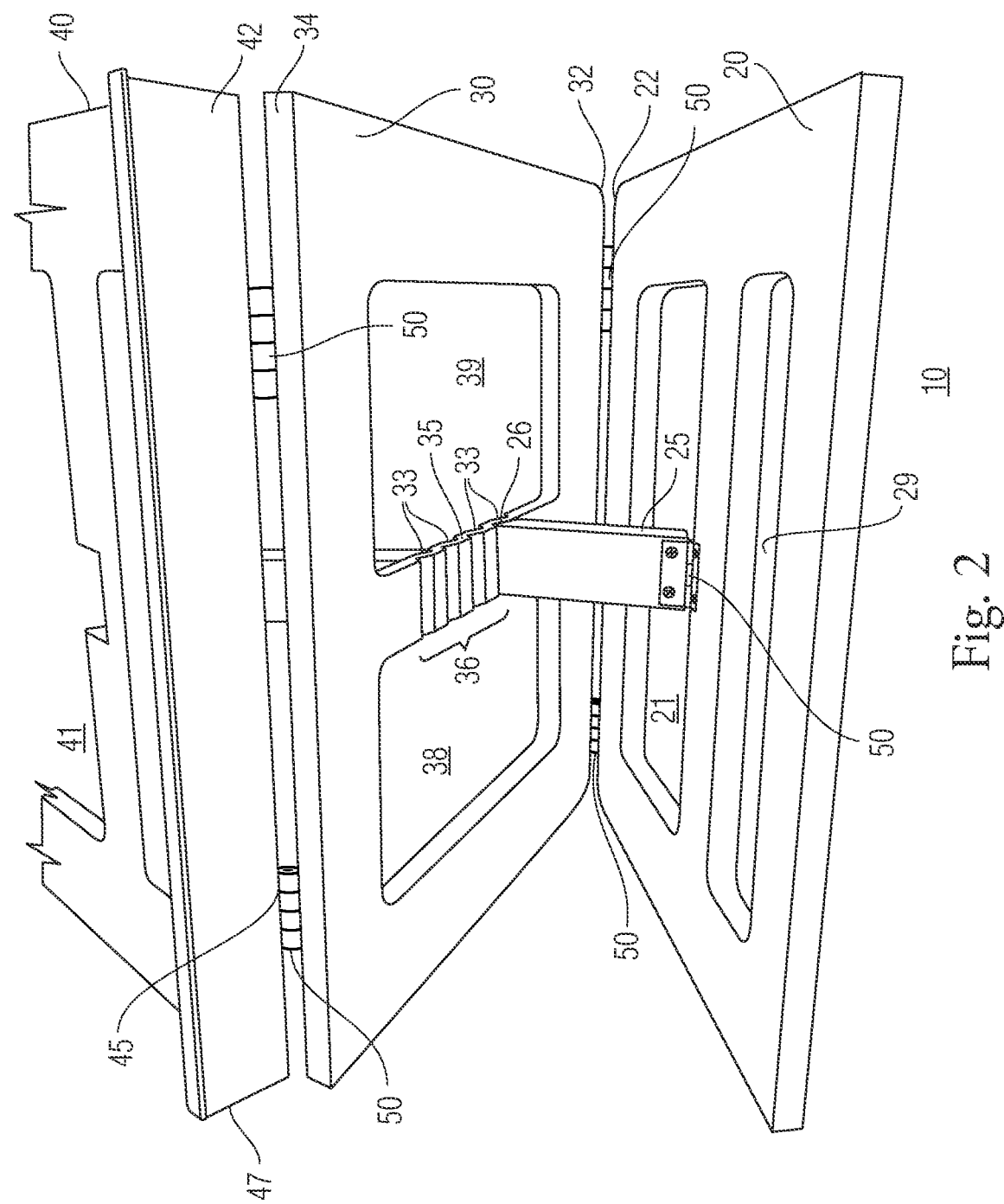
FIG. 2 shows the book stand of FIG. 1 in a front view of an open state.
Figure 3:
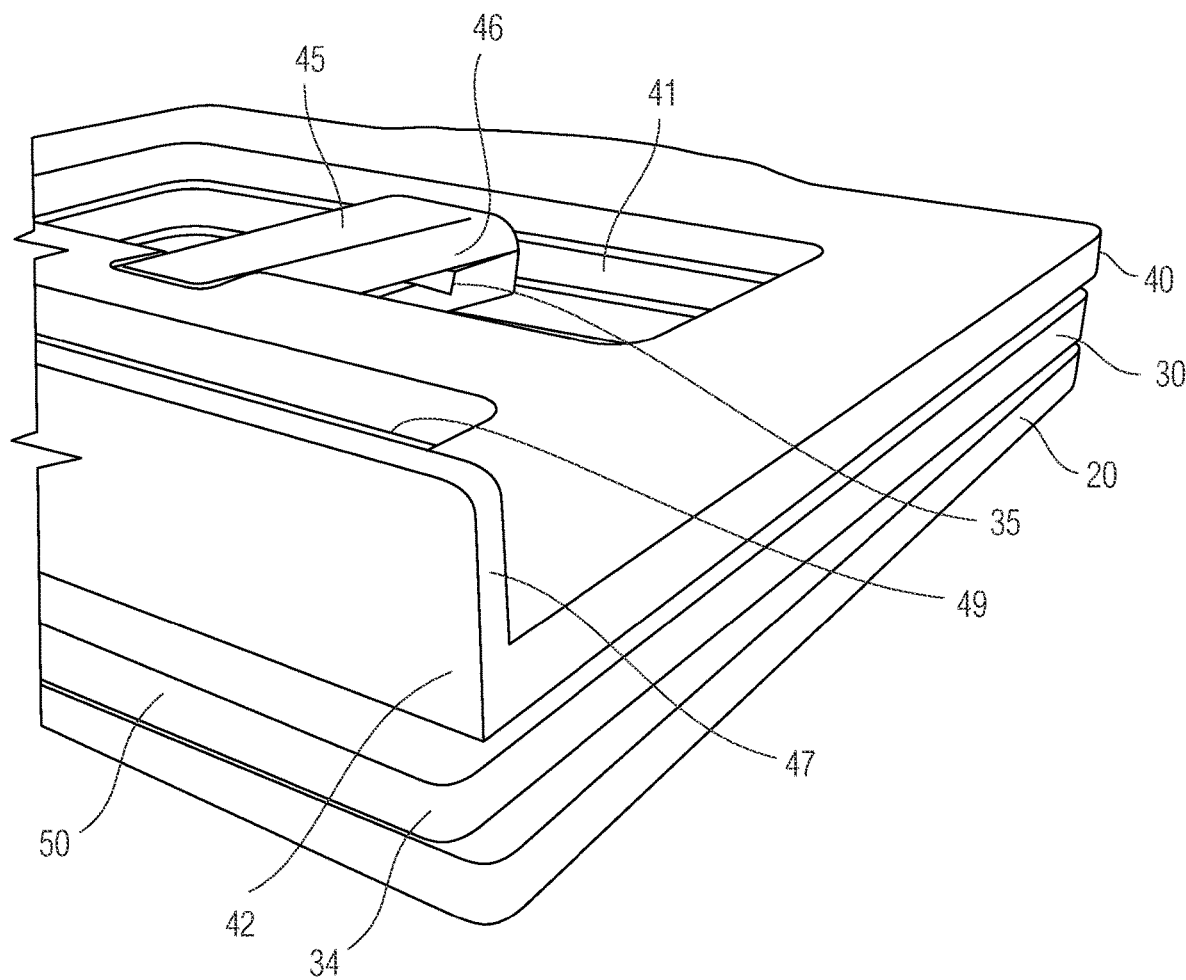
FIG. 3 shows the book stand of FIG. 1 in a closed state.
Figure 6:
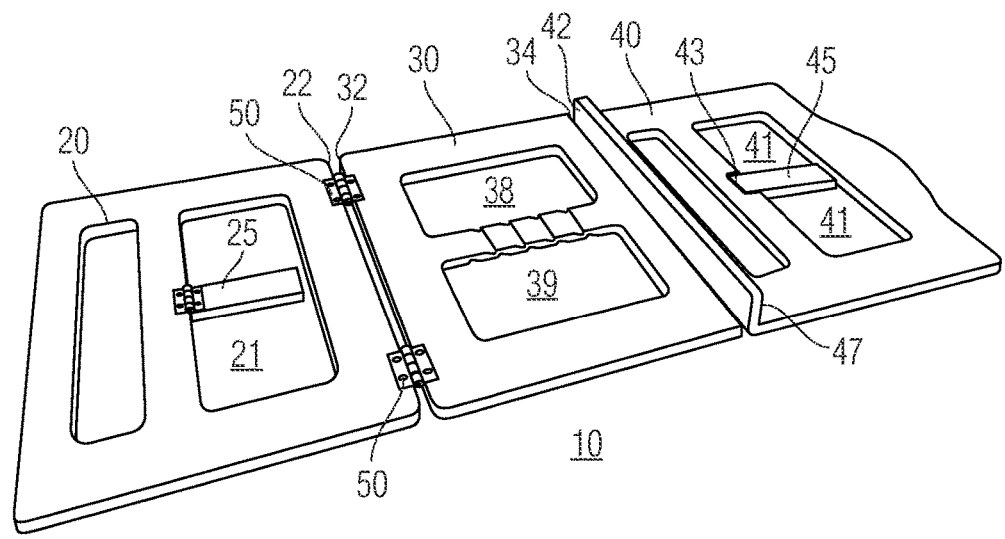
FIG. 6 shows a top plan view of the book stand of FIG. 1 in a non-functional condition.

3) and to an open state whereby an end 46 is positioned to engage one of the first plurality of notches 33 (see FIGS. 1, 2, and 3).

Figure 5:
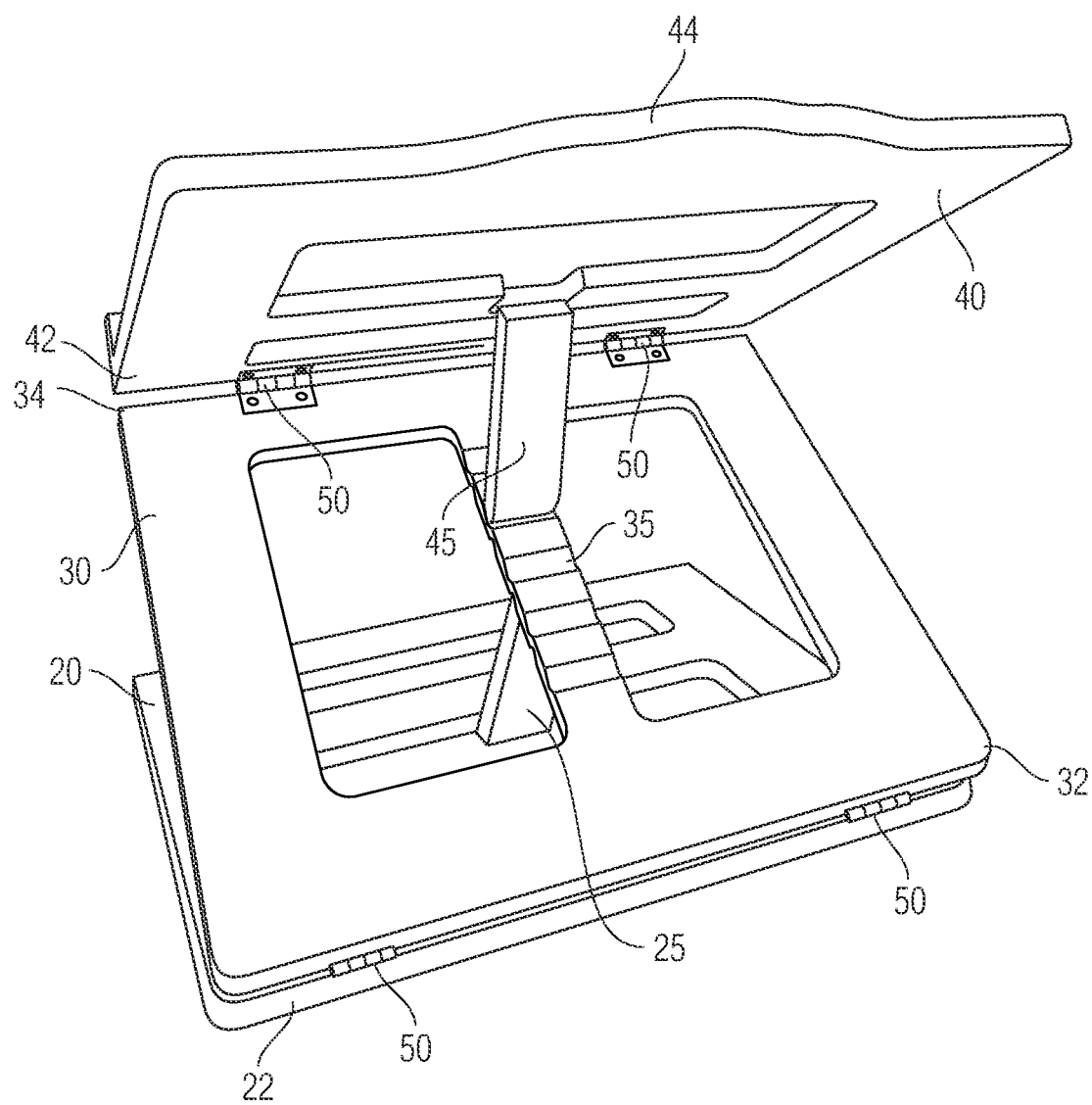
FIG. 5 shows the book stand of FIG. 1 in a back view of an open state.

The bottom section 20 similarly is provided with an aperture 21 and a rigid stem 25 that flexibly interconnects to an edge 23 of the bottom section aperture 21 and can pivot from a closed state whereby the stem 25 is recessed within the bottom section aperture 21 and does not project beyond the thickness of the bottom section 20 (see FIG. 6), and an open state whereby an end 26 is positioned to engage one of the second plurality of notches 36 (see FIGS. 1, 2, and 5)

Thus, in one embodiment, with reference to FIG. 3, the three sections 20, 30 and 40 can be placed in a closed position, with the bottom 20, middle 30 and top 40 sections essentially in superposition, in parallel, and in a flat, thin structure. In one embodiment, the spacing between the three sections 20, 30, 40 is minimized by recessing the hinges 50 to be below the opposing facing surfaces of the top 40, middle 30 and bottom 20 sections, such that such facing surfaces may be in touching contact in the closed state. Alternately, the hinges 50 may be secured so that the pivot extends above the facing surfaces, thus defining a small gap between those opposing facing surfaces.

According to a further embodiment, the first and/or second plurality of notches 33 and 36 may be symmetrical or asymmetrical, and may be provided with a contoured surface, such as a stair-like, u-shaped, or zig-zag contour so that when the end 46 of stem 45, and/or end 26 of bottom stem 25 engages one of said corresponding notches 33 and/or 36, it does so at an angle that the contour of the notch urges the stem into a force fit formed by the notch to enhance the stability of the friction engagement, particularly when pressure is applied to the top section 40 as by placing a book or one's hands on the top section 40, rather than urging the stem to slip along the contour of the notch, whereby the stand might collapse by some amount.

Figure 4:
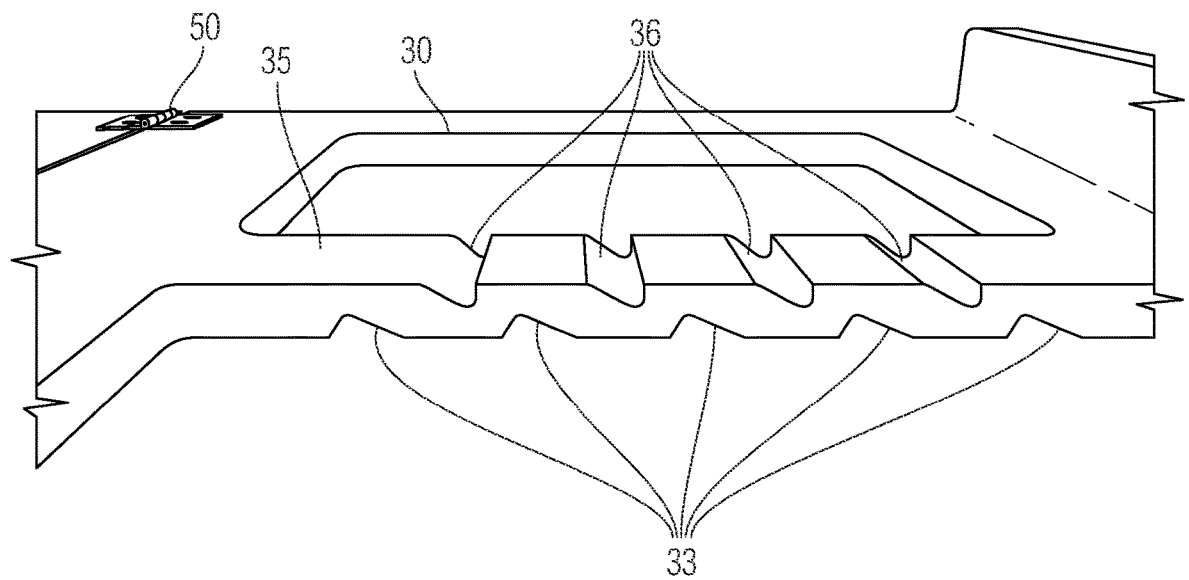
FIG. 4 shows an isolated side view of a middle section strut of the book stand of FIG. 1.
Figure 4A:
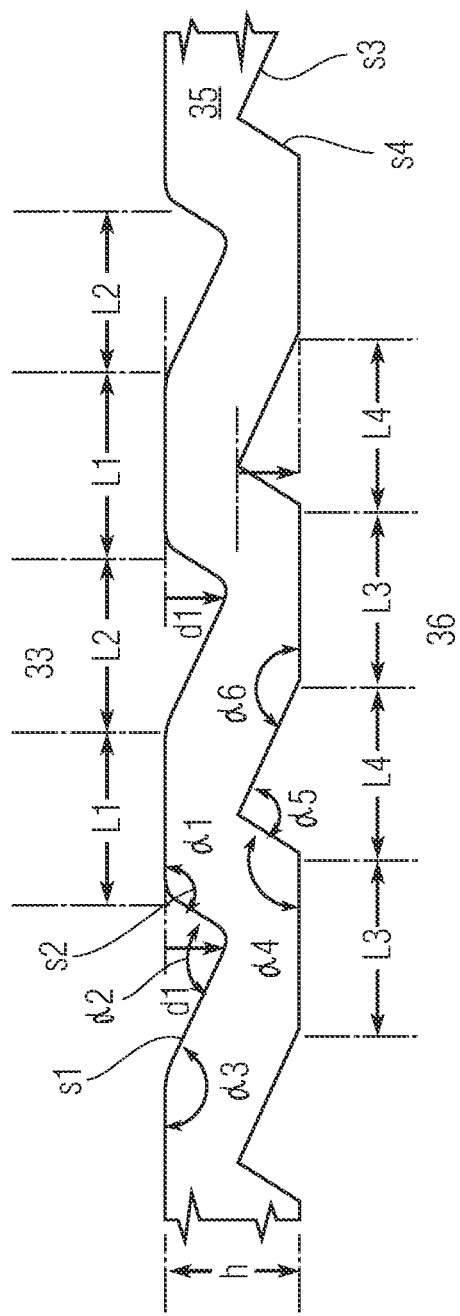
FIG. 4a shows the middle section strut of FIG. 4 in greater detail.

In one embodiment, with reference to FIGS. 4 and 4a, strut 35 having a height dimension h is provided with a first plurality of notches 33 and a second plurality of notches 36 disposed on opposing surfaces, with notches 33 presenting to the top section stem 45 and notches 36 presenting to the bottom section stem 25, with each notch 33 being defined by cut out contour having a length L2, depth d1, a first angle $\alpha 1$, a second angle $\alpha 2$, and a third angle $\alpha 3$, with flat planar surfaces extending between the angles, and a spacing L1 between adjacent notches. In a preferred embodiment, notches 33 may be constructed with the following dimensions: h=0.5 inches, L1=0.5 inches, L2=0.75 inches, d1=0.25 inches, $\alpha 1$=90 degrees, $\alpha 2$=90 degrees, and $\alpha 3$=135 degrees. The second plurality of notches 36 being defined by a cut out contour having a length L4, depth d2, a first angle $\alpha 4$, a second angle $\alpha 5$, and a third angle $\alpha 6$, with flat planar surfaces extending between the angles, and a spacing L3 between adjacent notches. In a preferred embodiment, notches 36 may be constructed with the following dimensions: h=0.5 inches, L3=0.75 inches, L4=0.5 inches, d2=0.25 inches, $\alpha 4$=90 degrees, $\alpha 5$=90 degrees, and $\alpha 6$=135 degrees. In one embodiment, the first plurality of notches comprises five notches, and the second plurality of notches comprises four notches, but these numbers are non-limiting values. For example, the number could be reversed with the first plurality of notches having four notches and the second plurality of notches having five notches. In another embodiment, the dimensions of the cut out contours for the first and second plurality of notches 33 and 36 can be approximately the same. It will be appreciated by one skilled in the art that the foregoing numerical values for the dimensions are merely representative and exemplary, as well as variable within reasonable manufacturing tolerances.

In one embodiment, the end 46 of top section stem 45 is provided with a contoured shape so as to form a secure force with one of the first plurality of notches 33. Such a shape may be a curved surface having a radius r and an edge 46a, for example, so that edge 46a fits flush against the surface s1 with the radius r presenting to surface s2 (see FIG. 4a). In the same way, bottom section stem 25 may be provided with a contoured shape so as to form a secure force with one of the second plurality of notches 36. Such a shape may be a curved surface having a radius r and an edge so that edge 46a fits flush against the surface s4 with the radius r presenting to surface s3 (see FIG. 4a). It should be understood however, that these dimensions may be varied, and non-uniform from one notch to the next in the given plurality. It also should be understood that the cut out need not have planar surfaces but may be curved, provided that the curved contour is sufficient to receive and engage the corresponding stem without slipping.

In an advantageous embodiment, the first 33 and second 36 plurality of notches are formed in strut 35 in a mirror-like construction on the opposing surfaces of strut 35 so that when strut 35 is formed and made integral to middle section 30 the contours of the notches are presented in the same orientation relative to the top stem 45 and the bottom stem 25, i.e., the first and second notches are interchangeable, thereby to minimize the inventory part count and hence the manufacturing and assembly cost.

According to a further embodiment, the top section 40 may include a lip 47 projecting from the planar surface of the top section 40 so as to act as a structure to retain material, e.g., a book, on the top section 40 when the top section 40 is in an open position having a desired reading angle that presents the material to the user so that the material will not slide off the top section 40. Preferably, lip 47 extends perpendicular from top section 40.

According to a further embodiment, the top 40, middle 30, and bottom 20 sections are all made of a common material, preferably wood, for example, pine, oak, maple, or birch, optionally stained and/or finished in a conventional manner, so as to present a warm aesthetic conducive to studying and learning without the distractions of brass or metal. In a preferred embodiment, the wood sections have a thickness h in a range of from 0.25 to 1.0 inch, more preferably about 0.5 inches. It should be understood, however, that other materials, such as plastic, plywood, wood composite, plexiglass, steel, and other materials could be used in the present invention.

According to a still further embodiment, the middle section 30 may be constructed of a perimeter frame of material having strut 35 extending between the one edge 32 and the other edge 34 with apertures 38 and 39 on each side of strut 35. Apertures 38 and 39 provide two advantages. One is that they reduce the overall weight of the structure and make it more portable. The other is that they permit the user easy access to the stems 25 and 45 for adjusting and setting the height of the book stand 10 for the user, particularly when the user is moving between a sitting and a standing position. The size of apertures 38 and 39 is a matter of design preference, as it should be understood that preferably the size is large enough to facilitate the user's ability to manipulate the top section stem 45 and/or the bottom section stem 25 for engaging with the appropriate notches to position the top section 40 at the desired height and angle for reader, and to further adjust the height for when the user is using the book stand in a standing or sitting position, but not so large as to impair the structural integrity of middle section 30.

In one preferred embodiment, the perimeter of top section 40 measures about 14×11 inches, the perimeter of middle section 30 measures about 14×11 inches, and the perimeter of bottom section 20 measures about 14×11 inches, each having a thickness h of about 0.5 inches. In another embodiment, the perimeters of the top 40, middle 30 and bottom 20 sections are generally rectangular, and optionally the top section second end 44 may have a non-linear contour, such as a wave, or sinusoidal like curve as is common in connection with books and lectern top edges.

According to one embodiment, the book stand 10 provided is easily stored in a flat, compact state, and can be opened and adjusted to a desired height and reading angle by raising the top section to the desired height and reading angle, and then engaging the top section stem 45 and the bottom section stem 25 to the desired locations of the first and second plurality of notches 33 and 36 on the middle section strut 35, respectively, to secure the book stand 10 at its desired height. Advantageously, should the user want to adjust the height so as to move from a sitting to a standing position, or vice versa, or to adjust the height for a different sized user, this can be easily done without need for tools or special assistance by simply slightly raising the top section 40 so that the bottom section stem 25 falls out of the notch it was previously engaged with and returns to bottom section aperture 21, moving the top section 40 and top section stem 45 to their desired positions and engaging the top section stem 45 with the appropriate one of the first plurality of notches 33, and then adjusting the bottom section stem 25 to engage the appropriate one of the second plurality of notches 36, so as to place the book stand 10 in the desired open position. Optionally, springs may be provided connected to one or both of the top section stem 45 and bottom section stem 25 to provide a bias force to urge the respective stem toward one of an open position against strut 35, or a closed position retracted within top section 40 and bottom section 20, which bias force is overcome by placing the stem in the desired location. In one such embodiment, spring loaded hinges may be used to impart the bias force of the spring.

According to a preferred embodiment, top section 40 may have a second aperture 49, and bottom section 20 may have a second aperture 29, which may be sized in accordance with a design preference, for aesthetic and/or weight reduction purposes. In a preferred embodiment, the apertures 41 and 49 of the top section 40 and the apertures 21 and 29 of the bottom section 20 may be similarly dimensioned. In one embodiment, top section 40, middle section 30 and bottom section 20 have a thickness selected from a range between 0.25 and 1.0 inch, more preferably 0.5, inches, and more preferably having a common thickness h of about 0.5 inches.

According to a preferred embodiment, top section stem 45 is secured to edge 43 of top section 40 in a u-shaped recess. Advantageously, this u-shaped recess operates to position the hinge 50 securing stem 45 to edge 43 so that in the closed position it is superimposed over one of the first plurality of notches 33 so as not to impede the flatness of the closed position. Optionally, bottom section stem 25 may be secured to a u-shaped recess in the edge of bottom section aperture 21 (not shown). Advantageously, the position of hinge 50 securing step 25 to the edge of bottom section aperture 21 is such that in the closed position hinge 50 is superimposed over one of the second plurality of notches 36 so as not to impede the flatness of the closed position.

The subject matter described above is provided by way of illustration only and should not be construed as limiting. Various modifications and changes can be made to the subject matter described herein without following the example embodiments and applications illustrated and described, and without departing from the true spirit and scope of the present invention.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" and the like designate directions in the drawings to which reference is made, but are not limiting with respect to the orientation in which the modules or any assembly of them may be used.

Notably, the figures and examples above are not meant to limit the scope of the present application to a single implementation, as other implementations are possible by way of interchange of some or all of the described or illustrated elements. Moreover, where certain elements of the present application can be partially or fully implemented using known components, only those portions of such known components that are necessary for an understanding of the present application are described, and detailed descriptions of other portions of such known components are omitted so as not to obscure the application. In the present specification, an implementation showing a singular component should not necessarily be limited to other implementations including a plurality of the same component, and vice-versa, unless explicitly stated otherwise herein. Moreover, applicant does not intend for any term in the specification or claims to be ascribed an uncommon or special meaning unless explicitly set forth as such. Further, the present application encompasses present and future known equivalents to the known components referred to herein by way of illustration.

The foregoing description of the specific implementations will so fully reveal the general nature of the application that others can, by applying knowledge within the skill of the relevant art(s) (including the contents of the documents cited and incorporated by reference herein), readily modify and/or adapt for various applications such specific implementations, without undue experimentation, without departing from the general concept of the present application. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings are shown accordingly to one example and other dimensions can be used without departing from the invention.

While various implementations of the present application have been described above, it should be understood that they have been presented by way of example, and not limitation.

It would be apparent to one skilled in the relevant art(s) that various changes in form and detail could be made therein without departing from the spirit and scope of the application. Thus, the present application should not be limited by any of the above-described example implementations.

What is claimed is:

1. A collapsible, portable, variable height book stand comprising:
   a bottom section, a middle section, and a top section, each section being generally planar and having a first height, a first end and a second end opposite the first end,
   a first end of the top section being pivotally secured to a first end of the middle section, the second end of the middle section being pivotally secured to a first end of the bottom section;
   the middle section further comprising a strut having a length, a first side and a second side, the first and second sides defining therebetween a thickness that is less than or equal to the first height of said middle section, a first plurality of notches on the first side of the strut and a second plurality of notches on the second side of the strut;
   the top section further comprising a first aperture having a first edge and a top section stem having a length, a first end and a second end, the first end of the top section stem being pivotally connected to the first edge of the top section, the second end of the top section stem having a contoured surface for engaging at least one of the first plurality of notches, the top section stem being pivotably moveable between a closed state wherein the top section stem is recessed within the first aperture of the top section, and an open state wherein the top section stem is engaged in one of the first plurality of notches;
   the bottom section further comprising a first aperture having a first edge and a stem having a length, a first end and a second end, the first end of the bottom section stem being pivotally connected to the first edge of the bottom section, the second end of the bottom section stem having a contoured surface for engaging at least one of the second plurality of notches, the bottom section stem being pivotably moveable between a closed state wherein the bottom section stem is recessed within the first aperture of the bottom section, and an open state wherein the bottom section stem is engaged in one of the second plurality of notches;
   wherein the book stand further comprises a closed state with the bottom, middle and top sections superimposed with their planar surfaces in parallel, and an open state having a book stand height selectable in response to the top section stem being engaged with one of the first plurality of notches and the bottom section stem being engaged with one of the second plurality of notches.

2. The book stand of claim 1 wherein the first plurality of notches further comprises a plurality of contours spaced apart along said strut, each contour having a recess including a corner for receiving the second end of the top section stem in a non-slip position; and the second plurality of notches further comprises a plurality of contours space apart along said strut, each contour having a recess and a corner for receiving the second end of the bottom section stem in a non-slip position.

3. The book stand of claim 2 wherein each said contour further comprises an angular recess forming an angle between 90 degrees and 150 degrees.

4. The book stand of claim 2 wherein the second end of the top section stem further comprises a sharp second edge and a curved surface and the second end of the bottom section stem further comprises a sharp second edge and a curved surface.

5. The book stand of claim 4 wherein the top section further comprises a lip projecting from the second edge so that a book placed on the top section will not slide off when the top section is in an open position.

6. The book stand of claim 1 wherein the top, middle, and bottom sections further comprise a wood material.

7. The book stand of claim 6 further comprising a plurality of hinges to provide said pivotable connections.

8. The book stand of claim 1 wherein the middle section further comprises an aperture on either side of the strut.

9. The book stand of claim 1 wherein the top, middle and bottom sections consist essentially of a wood material.

10. A book stand comprising:
    a bottom section, a middle section, and a top section, each section being generally planar and having a first height, a first end and a second end opposite the first end; and
    a strut mounted on the middle section, having a length, a first side and a second side, the first and second sides defining therebetween a thickness that is less than or equal to the first height of said middle section, a first plurality of notches on the first side of the strut and a second plurality of notches on the second side of the strut;
    a first end of the top section being pivotally secured to a first end of the middle section, the second end of the middle section being pivotally secured to a first end of the bottom section;
    the top section further comprising a first aperture having a first edge and a top section stem having a length, a first end and a second end, the first end of the top section stem being pivotally connected to the first edge of the top section, the second end of the top section stem having a contoured surface for engaging at least one of the first plurality of notches, the top section stem being pivotably moveable between a closed state wherein the top section stem is recessed within the first aperture of the top section, and an open state wherein the top section stem is engaged in one of the first plurality of notches;
    the bottom section further comprising a first aperture having a first edge and a stem having a length, a first end and a second end, the first end of the bottom section stem being pivotally connected to the first edge of the bottom section, the second end of the bottom section stem having a contoured surface for engaging at least one of the second plurality of notches, the bottom section stem being pivotably moveable between a closed state wherein the bottom section stem is recessed within the first aperture of the bottom section, and an open state wherein the bottom section stem is engaged in one of the second plurality of notches;
    wherein the book stand further comprises a closed state with the bottom, middle and top sections superimposed with their planar surfaces in parallel, and an open state having a book stand height selectable in response to the top section stem being engaged with one of the first plurality of notches and the bottom section stem being engaged with one of the second plurality of notches.

11. The book stand of claim 10 wherein the first plurality of notches further comprises a plurality of contours spaced apart along said strut, each contour having a recess including a corner for receiving the second end of the top section stem in a non-slip position; and the second plurality of notches further comprises a plurality of contours space apart along said strut, each contour having a recess and a corner for receiving the second end of the bottom section stem in a non-slip position.

12. The book stand of claim 11 wherein each said contour further comprises an angular recess forming an angle between 90 degrees and 150 degrees.

13. The book stand of claim 11 wherein the second end of the top section stem further comprises a sharp second edge and a curved surface and the second end of the bottom section stem further comprises a sharp second edge and a curved surface.

14. The book stand of claim 13 wherein the top section further comprises a lip projecting from the second edge so that a book placed on the top section will not slide off when the top section is in an open position.

15. The book stand of claim 10 wherein the top, middle, and bottom sections further comprise a wood material.

16. The book stand of claim 15 further comprising a plurality of hinges to provide said pivotable connections.

17. The book stand of claim 10 wherein the middle section further comprises an aperture on either side of the strut.

18. The book stand of claim 10 wherein the top, middle and bottom sections consist essentially of a wood material.

19. A method comprising:
   providing a book stand with a bottom section, a middle section, and a top section, each section being generally planar and having a first height, a first end and a second end opposite the first end;
   providing a strut mounted on the middle section, having a length, a first side and a second side, the first and second sides defining therebetween a thickness that is less than or equal to the first height of said middle section, a first plurality of notches on the first side of the strut and a second plurality of notches on the second side of the strut;
   wherein a first end of the top section is pivotally secured to a first end of the middle section, the second end of the middle section being pivotally secured to a first end of the bottom section;
   wherein the top section further comprises a first aperture having a first edge and a top section stem having a length, a first end and a second end, the first end of the top section stem being pivotally connected to the first edge of the top section, the second end of the top section stem having a contoured surface for engaging at least one of the first plurality of notches, the top section stem being pivotably moveable between a closed state wherein the top section stem is recessed within the first aperture of the top section, and an open state wherein the top section stem is engaged in one of the first plurality of notches;
   wherein the bottom section further comprises a first aperture having a first edge and a stem having a length, a first end and a second end, the first end of the bottom section stem being pivotally connected to the first edge of the bottom section, the second end of the bottom section stem having a contoured surface for engaging at least one of the second plurality of notches, the bottom section stem being pivotably moveable between a closed state wherein the bottom section stem is recessed within the first aperture of the bottom section, and an open state wherein the bottom section stem is engaged in one of the second plurality of notches;
   adjusting the book stand between one of a closed state with the bottom, middle and top sections superimposed with their planar surfaces in parallel, and an open state having a book stand height selectable in response to the top section stem being engaged with one of the first plurality of notches and the bottom section stem being engaged with one of the second plurality of notches.

20. The method of claim 19 wherein the first plurality of notches further comprises a plurality of contours spaced apart along said strut, each contour having a recess including a corner for receiving the second end of the top section stem in a non-slip position; and the second plurality of notches further comprises a plurality of contours space apart along said strut, each contour having a recess and a corner for receiving the second end of the bottom section stem in a non-slip position.

* * * * *